United States Patent

Washizu

[11] Patent Number: 5,154,451
[45] Date of Patent: Oct. 13, 1992

[54] CONNECTOR FOR CONNECTING THIN PIPE WITH BLOCKS FORMED ON CLAW WALLS

[75] Inventor: Katsushi Washizu, Numazu, Japan
[73] Assignee: Usui Kokusai Sangyo Kaisha Limited, Japan
[21] Appl. No.: 640,143
[22] Filed: Jan. 11, 1991
[30] Foreign Application Priority Data Jan. 20, 1990 [JP] Japan .................................. 2-11491

[51] Int. Cl.⁵ ............................................. F16L 37/00
[52] U.S. Cl. ................................... 285/319; 285/921
[58] Field of Search ........................... 285/319, 921

[56] References Cited

U.S. PATENT DOCUMENTS

| | | |
|---|---|---|
| 2,892,991 | 6/1959 | Beebee et al. . |
| 3,169,030 | 2/1965 | Lippincott . |
| 3,453,005 | 7/1969 | Foults . |
| 3,826,523 | 7/1974 | Eschbaugh . |
| 3,933,378 | 1/1976 | Sandford et al. . |
| 4,026,581 | 5/1977 | Pasbrig . |
| 4,035,005 | 7/1977 | DeVincent et al. . |
| 4,074,912 | 2/1978 | Van Bilderbeek et al. . |
| 4,219,222 | 8/1980 | Brusadin . |
| 4,275,907 | 6/1981 | Hunt . |
| 4,451,069 | 5/1984 | Melone . |
| 4,541,658 | 9/1985 | Bartholomew ............... 285/319 |
| 4,601,497 | 7/1986 | Bartholomew . |
| 4,637,636 | 1/1987 | Guest . |
| 4,637,640 | 1/1987 | Fournier et al. . |
| 4,673,199 | 6/1987 | Renfrew . |
| 4,681,351 | 7/1987 | Bartholomew . |
| 4,730,856 | 3/1988 | Washizu . |
| 4,749,214 | 6/1988 | Hoskins et al. . |
| 4,753,458 | 6/1988 | Case et al. . |
| 4,776,616 | 10/1988 | Umehara et al. . |
| 4,778,203 | 10/1988 | Bartholomew . |
| 4,781,400 | 11/1988 | Cunningham . |
| 4,793,637 | 12/1988 | Laipply et al. . |
| 4,834,423 | 5/1989 | DeLand ....................... 285/921 |
| 4,895,396 | 1/1990 | Washizu . |
| 4,913,467 | 4/1990 | Washizu . |
| 4,915,420 | 4/1990 | Washizu . |
| 4,915,421 | 4/1990 | Dennany, Jr. ................ 285/921 |
| 4,923,228 | 5/1990 | Laipply ....................... 285/921 |
| 4,943,091 | 7/1990 | Bartholomew ............... 285/921 |
| 4,944,537 | 7/1990 | Usui et al. . |
| 4,946,205 | 8/1990 | Washizu . |
| 4,948,176 | 8/1990 | Bartholomew ............... 285/921 |
| 4,948,180 | 8/1990 | Usui et al. . |
| 4,964,658 | 10/1990 | Usui et al. . |
| 4,997,216 | 3/1991 | Washizu . |
| 5,002,315 | 3/1991 | Bartholomew ............... 285/921 |

FOREIGN PATENT DOCUMENTS 593413 5/1959 Italy .
855603 12/1960 United Kingdom .

Primary Examiner—Eric K. Nicholson

[57] ABSTRACT

There is disclosed a compact connector for stably connecting a metallic or resinous pipe or tube having a relatively small diameter of about less than 20 mm, the pipe having an outwardly swelling annular wall. The connector comprises a connector body, seal members, and a socket body fabricated independent of the connector body. The connector body has a small chamber in which the seal members are fitted. The socket body has a pair of protruding resilient claw walls, an annular wall pushing the seal members, and arms extending radially outwardly and rearwardly. When the pipe is connected, the front surfaces of claw walls are brought into resilient contact with the swelling annular wall of the pipe. The rear surfaces of the claw walls engage the rear end surface of the connector body.

6 Claims, 2 Drawing Sheets

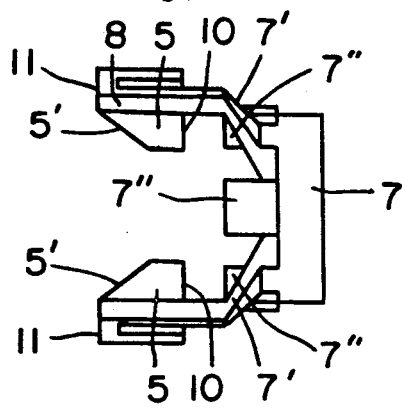
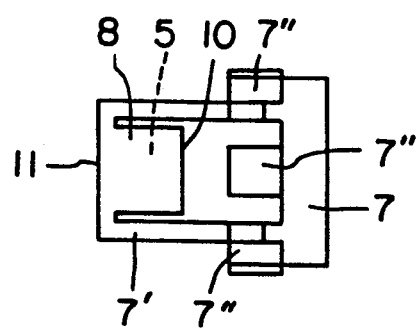
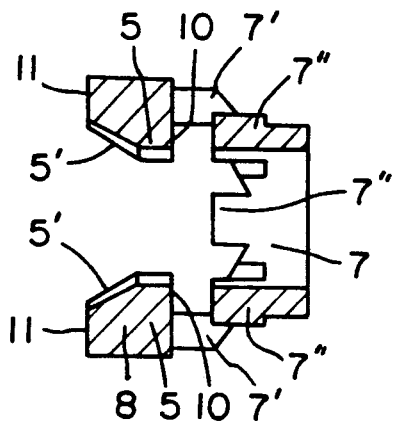
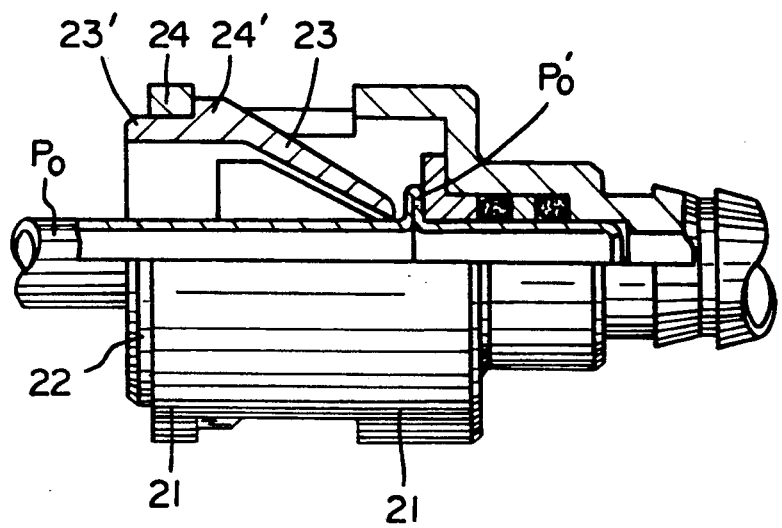

5,154,451

CONNECTOR FOR CONNECTING THIN PIPE WITH BLOCKS FORMED ON CLAW WALLS

BACKGROUND OF THE INVENTION

1. Field of the Invention

The present invention generally relates to a connector for connecting a relatively thin metallic or resinous pipe or tube which has a diameter less than about 20 mm and which is mounted in an automobile, machine, apparatus, or the like to supply oil or air.

2. Description of the Prior Art

A conventional connector of this kind is shown in FIG. 7. The body of the connector is indicated by numeral 21. The body 21 of the connector has a support wall portion 21' at its rear end. A socket body 22 has a pair of resilient claw walls 23 which are inclined forwardly. The socket body 22 is provided with a hole extending axially through the body 22. The claw walls 23 protrude from the wall defining this hole and are located in the front of the socket body 22 as viewed in the direction of insertion of the socket body. The claw walls 23 have annular wall portions 23' at their rear ends. The annular wall portions 23' have stepped portions 24. A pipe $P_o$ having an annular swelling wall portion $P_o'$ is inserted in the socket body 22 in such a way that the claw walls 23 are pressed against the swelling wall portion $P_o'$ and that the stepped portions 24 engage the support wall portion 21'. In this way, the pipe $P_o$ is connected.

In this prior art structure, when the pipe $P_o$ is connected, it is forced into the socket body 22. At this time, the claw walls 23 are brought into engagement with the pipe $P_o$ with a snap. Therefore, the socket body 22 must have a large diameter. The stepped portions 24 formed on the annular wall portions 23' in the rear of the socket body form shoulder portions, which in turn constitute a protruding annular wall portion 24'. When the stepped portions 24 are brought into engagement with the support wall portion 21', the annular wall portion 24' is pushed inwardly and crushed to permit the pipe to pass inside the support wall portion 21'. Again, the socket body 22 must have a large diameter. Accordingly, the whole assembly including the connector body 21 is made larger in size. This makes it difficult to install the assembly in a narrow space. In addition, the large diameter makes the claw walls 23 long. As a result, the socket body is brought into resilient contact with the swelling wall portion $P_o'$ of the pipe $P_o$ with a smaller force. Also, permanent set in fatigue is produced. When vibration is kept applied to the socket for a long term, looseness occurs in the axial direction, thus deteriorating the airtightness. This will induce leakage, make the connection unstable, or introduce other problems.

SUMMARY OF THE INVENTION

It is an object of the invention to provide a compact connector which is used for connecting a thin pipe and can be installed in a narrow space and which connector comprises a socket body having a small diameter, claw walls having swelling wall portions that make resilient contact with a pipe with increased force but do not produce permanent set in fatigue, whereby the airtightness and stable connection are maintained sufficiently over a long term.

The above object is achieved by a connector for connecting a thin pipe, comprising: a connector body having a connecting cylindrical wall on the side of the front end of the body and a small chamber extending axially through the body, the small chamber having an enlarged portion, the cylindrical wall having a communication hole, the small chamber being in communication with the communication hole, the connector body further including a peripheral wall portion, the connector body being provided with a pair of notches opposite to the peripheral wall portion, the connector body forming a support wall at its rear end; ring-shaped seal members inserted in the small chamber formed in the body; a socket body fabricated independent of the connector body and inserted in the enlarged portion of the small chamber, the socket body having a pair of resilient protruding claw walls located opposite to each other in the direction in which the socket is inserted, the rear end wall of the socket body engaging said support wall; the claw walls being adapted to make resilient contact with an annular outwardly swelling wall portions formed on the pipe inserted in the connector body, the outwardly swelling annular wall portion being located close to the end of the pipe at which it is connected; the socket body having an annular wall located in the front of the socket body as viewed in the direction of insertion, arms continuous with the rear of the annular wall and extending radially outwardly and rearwardly, and said resilient claw walls each taking the form of a block; the annular wall, the arms, and the resilient claw walls being formed as a unit; the annular wall being engaged in the small chamber and pressed against the ring-shaped annular members; each resilient claw wall having a rear end portion in the rear of the corresponding arm and protruding substantially perpendicularly to the axis of the arm such that the rear end portions of the claw walls are located opposite to each other, the rear end portions having tapering surfaces having openings in their rear surfaces; whereby when the socket body is inserted and engaged in the connector body, the front surfaces of the claw walls located at the positions of the notches in the connector body are pressed against the annular swelling wall portion of the inserted pipe, and the rear surfaces of the claw walls engage the support wall.

In another aspect of the invention, a stepped enlarged portion is formed at the rear of said small chamber, and a plurality of stopper walls are formed in the rear of the annular wall of the socket body to prevent rearward movement.

In this structure, the arms of the socket body are continuous with the front annular wall and extend rearwardly of the annular wall. The claw walls each taking the form of a block protrude inwardly of the arms from the rear of the arms. The claw walls extending from the arms can yield radially. Therefore, the diameter of the socket body can be made small. Hence, the whole assembly including the connector body can be rendered small. This permits the assembly to be installed in a narrow space. Also, the socket body can be easily inserted by pushing it from the rear side. When the pipe is mounted, the socket body is inserted from the rear side. At this time, the claw walls bear against the tapering surfaces of the swelling wall portions and are spread outwardly. As the claw walls are spread outwardly, the insertion is made more easily. When the socket body is engaged, the front surfaces of the claw walls located at the positions of the notches are pressed against the swelling wall portion. This structure allows the claw walls each assuming the form of a block to be shortened. Thus, the claw walls make resilient contact with the swelling wall portion with a greater force. Furthermore, the claw walls are prevented from producing permanent set in fatigue. The plural stopper walls protrude rearwardly toward the rear surface of the swelling wall portion and are engaged in the enlarged chamber formed at the rear of the small chamber. Therefore, the margin for compression of the ring-shaped seal members can be controlled. Hence, the airtightness can be maintained sufficiently over a long term. The reliable and stable connection can be retained.

BRIEF DESCRIPTION OF THE DRAWINGS

FIG. 4 is a plan view of the socket body shown in FIG. 1;

FIG. 5 is a top view of the socket body shown in FIG. 4;

FIG. 6 is a vertical cross section of the socket body shown in FIG. 4; and

FIG. 7 is a partially cutaway vertical cross section of the prior art connector, and in which a pipe is connected.

DETAILED DESCRIPTION OF THE PREFERRED EMBODIMENT

Figure 1:
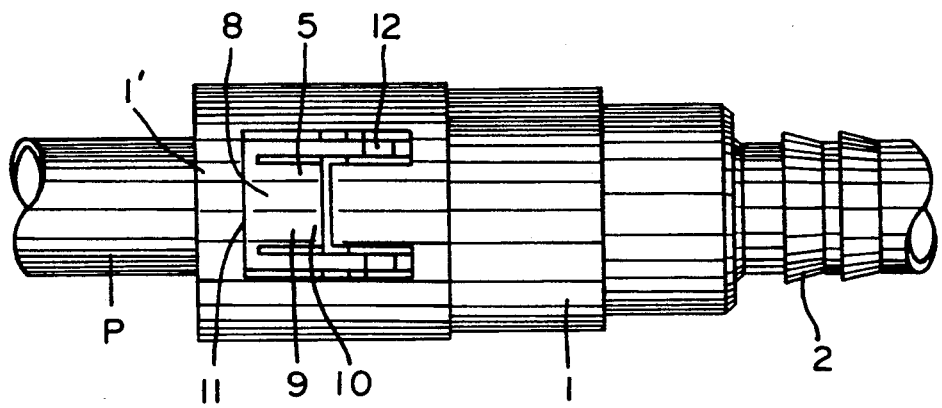
FIG. 1 is a partially cutway plan view of a connector according to the invention, and in which a thin pipe is connected.
Figure 2:
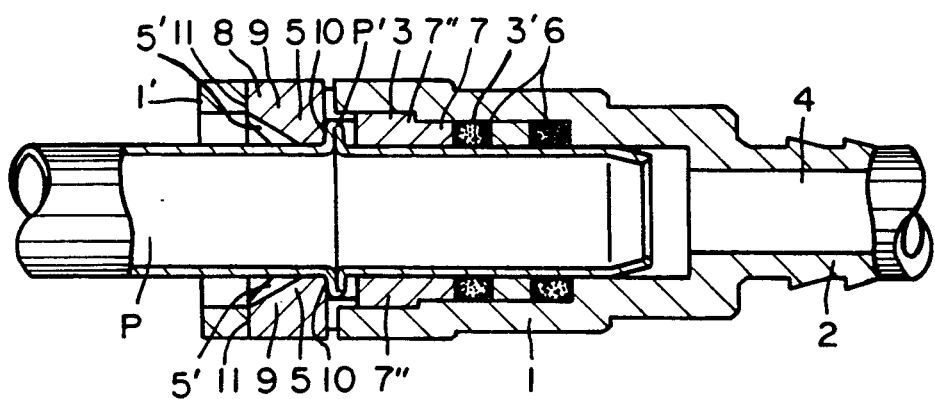
FIG. 2 is a vertical cross section of the connector shown in FIG. 1.
Figure 3:
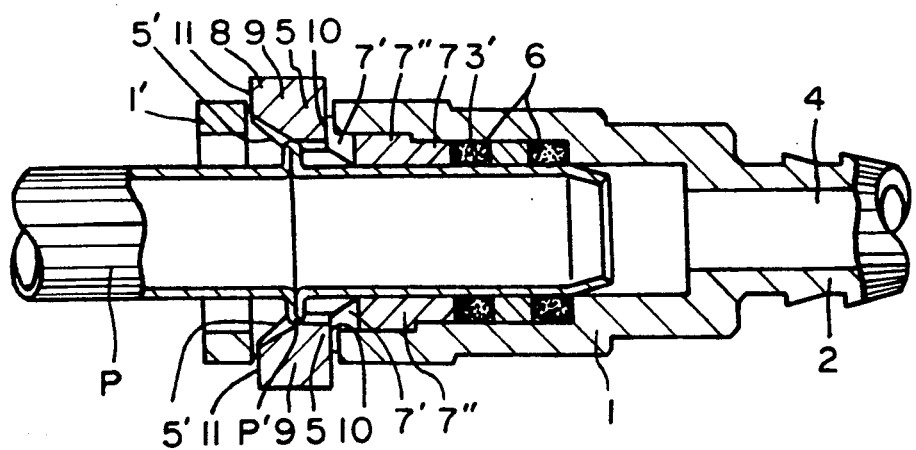
FIG. 3 is a cross section similar to FIG. 2, for illustrating the manner in which the pipe is mounted.

Referring to FIGS. 1-6, the body of a connector according to the invention is indicated by reference numeral 1. The body 1 has a connecting cylindrical wall 2 in its front. A resinous tube or rubber hose (not shown) is connected to this cylindrical wall 2 which is provided with a communication hole 4 extending along the axis of the body. The body 1 is provided with a small chamber 3' continuous with the communication hole 4. A stepped enlarged chamber 3 is formed in the body 1 at the rear of the small chamber 3'. The diameter of the enlarged chamber 3 is larger than that of the small chamber 3'. A pair of notches 9 is formed in the body 1 in an opposite relation to the peripheral wall defining the enlarged chamber 3. A support wall 1' is formed at the rear end of the body. Ring-shaped resilient members 6 made from rubber or other similar material are inserted in the small chamber 3', via spacers as the need arises.

A socket body 8 is made from a resilient material such as a resin and inserted in the connector body 1. The socket body 8 has an annular wall 7 formed in the front as viewed in the direction of insertion of the socket body 8, arms 7' continuous with the rear of the annular wall 7, and a pair of claw walls 5. The annular wall 7 is engaged in the small chamber 3' and pushes the seal members 6. The arms 7' extend radially outwardly and rearwardly. The arms have rear end portions which protrude substantially at right angles to the axis of the socket body and are located opposite to each other. Each claw wall 5 takes the form of a block. The claw walls 5 form tapering surfaces 5' which are provided with openings in their rear surfaces. An outwardly swelling wall portion P' is formed on a pipe P close to the end of the pipe at which the pipe is connected. When the pipe P is connected, the claw walls 5 cause the rear end portions of the arms 7' to bear against the annular swelling wall P' of the pipe. A plurality of protruding stopper walls 7" are formed in the rear surface of the annular wall 7 to prevent rearward movement.

When the socket body 8 is engaged in the enlarged chamber 3 formed in the connector body 1, the front surfaces 10 of the claw walls 5 located in the positions of the notches 9 in the connector body are pressed against the swelling wall P' of the inserted pipe P. The rear surfaces 11 of the claw wall 5 engage the support wall 1' at the locations of the notches 9. Slits 12 are continuous with the notches 9 and receive the arms 7' of the socket body 8. The stopper walls 7" are engaged in the enlarged chamber 3 formed behind the small chamber 3' to control the margin for compression of the ring-shaped seal members 6.

As described thus far, in the connector for connecting the thin pipe, the socket body 8 is continuous with the front annular wall 7. The claw walls 5 each taking the form of a block protrude inwardly from the rear sides of the arms 7' that extend rearwardly of the annular wall 7. The claw walls 5 of the arms 7' can radially yield. When the socket body 8 is inserted, the engaging surfaces 10 are pressed against the swelling wall portion P' at the locations of the notches 9. The claw walls 5 each taking the form of a block are short. Because of this structure, the diameter of the socket body 8 can be made small. Consequently, the whole assembly including the connector body 1 is made compact. The assembly can be easily installed in a narrow space without difficulty. The insertion can be performed easily by pushing it from the rear side. Furthermore, the structure of the claw walls 5 increases the force with which the claw walls make resilient contact with the swelling wall portion P'. The claw walls are prevented from producing permanent set in fatigue. The enlarged chamber 3 is made to bear against the stopper walls 7" to control the margin for compression of the ring-shaped seal members 6. As a result, the airtightness can be maintained sufficiently over a long term. The reliable stable connection can be retained. In this way, the novel connector for connecting a thin pipe yields various quite useful advantages.

What is claimed is:

1. A connector for connecting a thin pipe, said pipe having a front end and an annular swelling wall spaced from the front end, said annular swelling wall having a front side facing the front end of the pipe and an opposed rear side, said connector comprising:

a connector body having opposed front and rear ends, a communication hole extending rearwardly from the front end, a small chamber intermediate the front and rear ends of the connector body and communicating with the communication hole, a peripheral wall defining a large chamber extending into the rear end of the connector body and communicating with the small chamber, a plurality of notches formed through the peripheral wall of the connector body, portions of the peripheral wall at rearward extremes of the respective notches defining generally radially aligned front-facing support surfaces;

ring-shaped seal members disposed in the small chamber of the connector body for sealing engagement with portions of the thin pipe intermediate the annular swelling wall and the front end of the pipe; and a unitarily formed socket body having opposed front and rear ends, the front end of the socket body defining an annular wall at least partly disposed in the small chamber of the connector body and surrounding a portion of the pipe intermediate the annular swelling wall and the front end of the pipe, the annular wall of the socket body being disposed rearwardly of the ring-shaped seal members and pressing the ring-shaped seal members forwardly in the small chamber of the connector body, said socket body further comprising a plurality of resilient claw walls projecting rearwardly and outwardly from the annular wall of the socket body, the rear end of the socket body being defined by blocks formed respectively on the claw walls and spaced rearwardly of the annular wall, each said block being disposed entirely within the connector body and including a front-facing generally radially aligned engaging surface for engaging the rear side of the annular swelling wall of the pipe and a rear-facing generally radially aligned engaging surface for engaging the support surface of one said notch in the connector body, rearward portions of each said block adjacent the rear-facing engaging surfaces thereof being tapered to generate outward deflection of the resilient claw walls during insertion of the pipe between the resilient claw walls and into the connector body, whereby the rear-facing engaging surfaces of the blocks of the socket body lockingly engage the socket body in the connector body and whereby the annular swelling wall of the pipe is lockingly engaged between the front-facing surfaces of the blocks and the annular wall of the socket body for securely retaining the pipe in the connector body.

2. The connector of claim 1 wherein the pipe is a resinous tube.

3. The connector of claim 1 wherein the peripheral wall of the connector body includes slots projecting forwardly from the respective notches, said slots being aligned with the respective resilient claw walls for permitting outward deflection of the resilient claw walls during insertion of the pipe into the connector body.

4. The connector of claim 1, wherein a plurality of stopper walls protrude from the annular wall of the socket body and engage the connector body in a portion of the large chamber adjacent the small chamber thereof for controlling compression of the ring-shaped seal members.

5. The connector of claim 1, wherein said pipe is a metallic tube.

6. The connector of claim 1, wherein said socket body is made from a resin.

* * * * *